United States Patent [19]
Francis

[11] 4,063,564
[45] Dec. 20, 1977

[54] VIBRATORY CLEANING AND COATING SYSTEM

[76] Inventor: Theodore R. Francis, 855 Richard St., Aurora, Ill. 60504

[21] Appl. No.: 719,070

[22] Filed: Aug. 30, 1976

[51] Int. Cl.² ............................................. B08B 3/04
[52] U.S. Cl. .................................. 134/66; 134/132; 118/57; 118/417
[58] Field of Search .................. 134/65, 66, 83, 132; 118/57, 417, 123; 427/242, 346

[56] References Cited

U.S. PATENT DOCUMENTS

| | | | |
|---|---|---|---|
| 2,744,066 | 5/1956 | Spiess, Jr. et al. | 134/132 X |
| 2,746,468 | 5/1956 | Desmond et al. | 134/132 X |
| 3,024,133 | 3/1962 | White | 427/346 |
| 3,216,431 | 11/1965 | White | 134/132 |
| 3,853,094 | 12/1974 | Christini et al. | 118/417 |

*Primary Examiner*—Robert L. Bleutge
*Attorney, Agent, or Firm*—George H. Gerstman

[57] ABSTRACT

A system and apparatus for treating articles of variable size and shape is disclosed in the illustrative embodiment utilizing vibrating feeder bowls into which fluids are introduced for treating the articles simultaneously with their automatic advancement. The system is further adapted for various spacial dispositions in accordance with the area available. A particular system is disclosed for treating aluminum nails by continuous advancement through a succession of feeder bowls at which the nails are subject to cleaning, washing, coating and rinsing.

19 Claims, 9 Drawing Figures

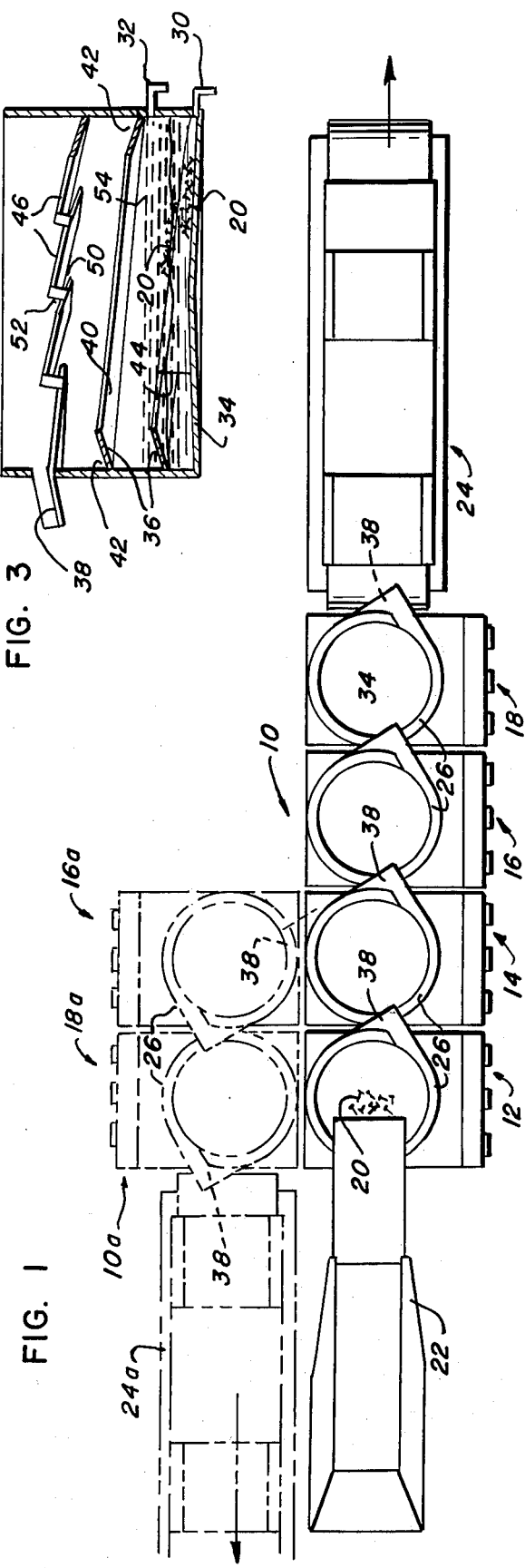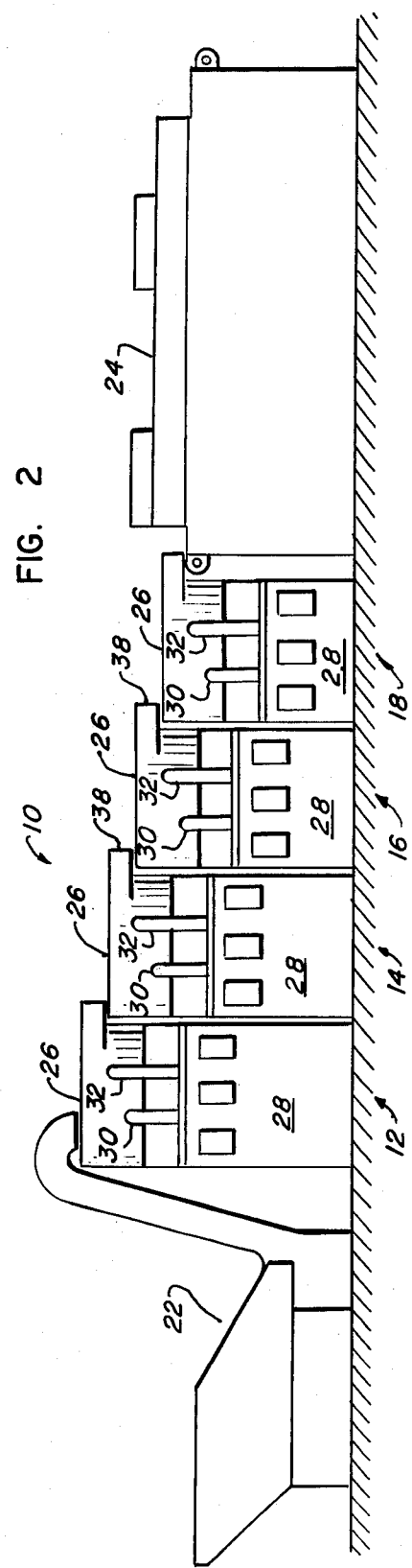

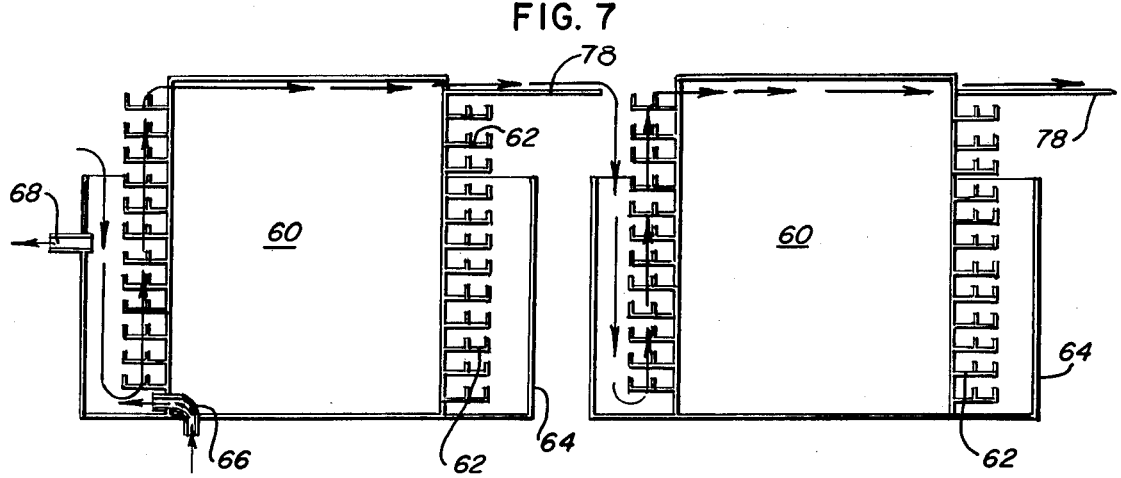
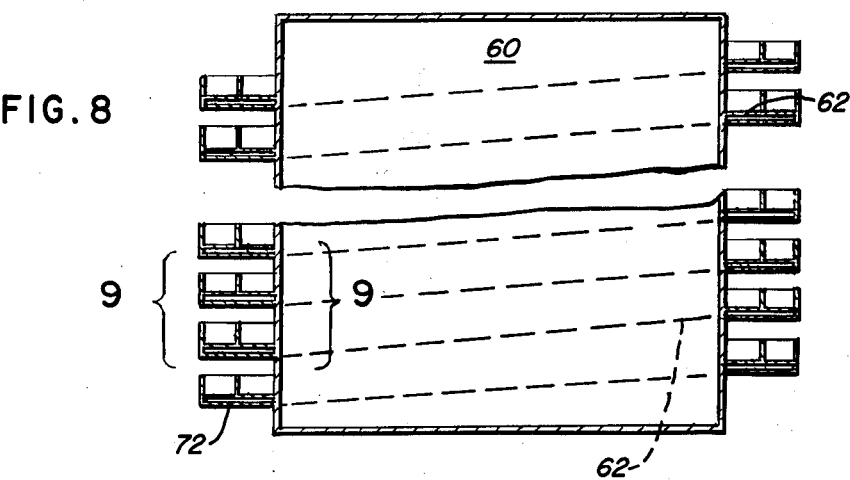
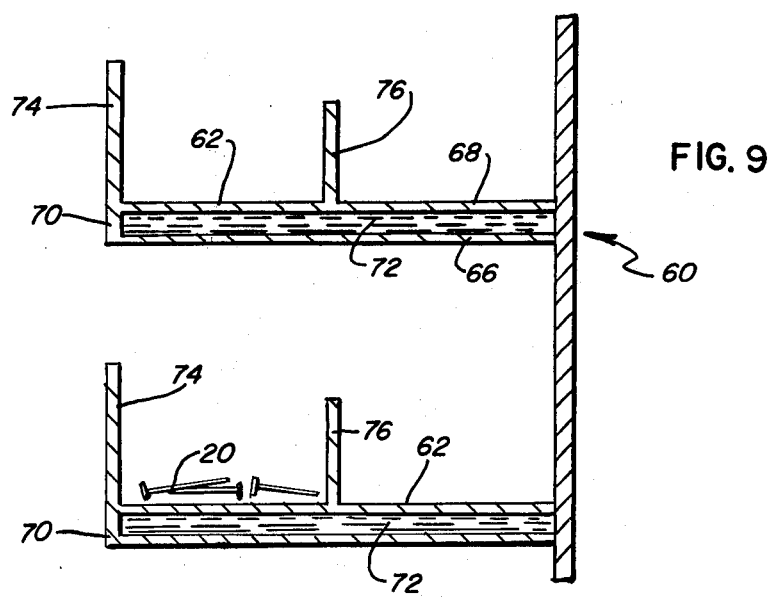

VIBRATORY CLEANING AND COATING SYSTEM

BACKGROUND OF THE INVENTION

This invention relates in general to an article treatment system and apparatus and more particularly to the fluid treatment of continuously moving articles whose size or shape render their handling difficult.

In the cleaning and coating of relatively small articles of either simple or complex shape, numerous problems are encountered since small articles are difficult or expensive to handle on an individual basis. Cleaning, therefore, is often done by depositing a batch of articles, such as nails, in a tank and utilizing relatively expensive ultrasonic apparatus to batch clean the articles. Even if ultrasonic apparatus is not used, the batch handling, of course, interrupts the continuous or automatic processing of the articles, while the lack of vibrating action may not provide adequate cleaning. Articles may also be deposited in a batch tank for coating, but this is not usually a preferred method since coating of the required surfaces is difficult to provide.

Alternatively, conveyor line treatment permitting either cleaning or coating of relatively small articles, such as nails, is difficult and expensive to provide since the equipment is usually specifically designed for the article, and once provided usually has no general utility for other or different articles or treatment.

Accordingly, one object of the present invention is to provide a system for enabling the fluid treatment of a wide variety of articles.

Another object of the present invention is to provide a system for fluid treatment of a different type of article, while the articles are in movement.

A further object of the present invention is to provide article cleaning and/or treating apparatus of improved economy.

Still another object of the present invention is to provide an article treating system which is capable of versatile spacial disposition.

Yet another object of the present invention is to provide an improved nail cleaning and coating system of greater economy and utility.

SUMMARY OF THE INVENTION

The present invention employs an unusually simple and economical expedient for enabling the treatment of a wide variety of articles by utilizing a vibratory feeder bowl into which both the articles and a treating fluid are introduced. As used in this application, fluids not only include liquids, such as cleaning or coating liquids typified by caustic solutions, water or paints, but also include fluidized particles.

The articles are deposited in a first feeder bowl from a hopper or the like and continuously advanced along the bowl track by the vibratory movement of the bowl. The bowl is conventionally vibrated at either 60HZ or 120 HZ to entrain the fluids with the articles for cleaning and coating. As the articles exit from the bowl, they are deposited either in another bowl for further treatment or passed to other apparatus for further processing. Thus the articles are treated with different fluids, as required, and are progressively and continuously moved through succeeding apparatus. The feeder bowls are arranged with their article outlets at desired angular orientations to enable the distribution of the bowls as required by the spacial situation of the area in which they are used.

For automatic aluminum nail treatment, the nails are treated with a caustic or phosphate cleaning solution in a first bowl and water washed in a second bowl, whereafter they are fed to a third bowl for an aluminum chromate coat and then again rinsed and fed to a drying oven.

A more detailed explanation of the invention is provided in the following description and claims and is illustrated in the accompanying drawings.

BRIEF DESCRIPTION OF THE DRAWINGS

FIG. 1 is a diagrammatic top elevational view illustrating a system in which the present invention is employed in different spacial arrangements;

FIG. 2 is a diagrammatic side elevational view of the apparatus shown in FIG. 1;

FIG. 3 is a sectional view of a feeder bowl modified in accordance with the principles of the present invention;

FIG. 7 is a cross-sectional elevational view, in generally schematic form, illustrating a modification of a system in which the present invention is employed;

FIG. 8 is an enlarged cross-sectional view of one of the tanks of the FIG. 7 embodiment; and FIG. 9 is an enlarged view of the portion of FIG. 8 within the circle 9.

DETAILED DESCRIPTION OF THE ILLUSTRATIVE EMBODIMENT

Figure 4:
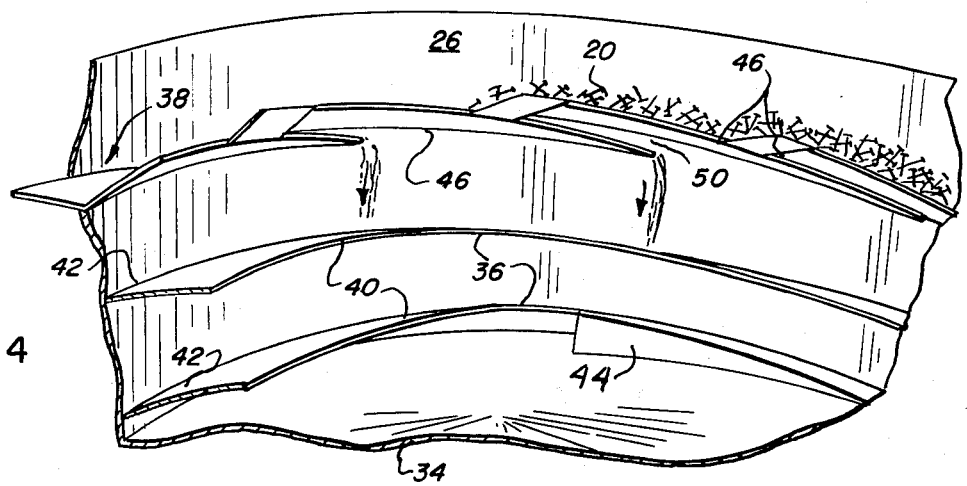
FIG. 4 is a partial isometric view of a portion of the feeder bowl and track shown in FIG. 3 modified in accordance with the principles of the present invention.

In FIGS. 1 and 2 a system employing the principles of the present invention is indicated by the reference character 10 and an alternate arrangement 10a of the system is indicated by the dashed lines in FIG. 1. The system 10 employs a series of in line vibratory bowl treatment stations 12, 14, 16 and 18 and in the arrangement 10a, treatment stations 16a and 18a are arranged in side by side relationship with the treatment stations 12 and 14, respectively, in place of the in line stations 16 and 18.

Station 12 is positioned to continuously receive articles 20, such as nails or the like, from a feed hopper 22 and the last station 18 or 18a is arranged to continuously feed the articles to succeeding progressing apparatus, such as a drying oven 24 or 24a, respectively.

Each treatment station 12, etc. comprises a metal bowl or basket 26 of the type similar to that used in vibratory feeders and vibrating apparatus is provided for vibrating each bowl 26 at either 60HZ or 120HZ, for example. Vibrating feeders including vibrating apparatus are conventional, and are sold throughout the United States by Feeder Corporation of America, 4429 James Pl., Melrose Park, Ill. Theodore R. Francis U.S. Pat. No. 3,700,068 shows a conventional vibratory feeder in a noise reduction canopy device. The apparatus 28 in this case includes conventional controls and apparatus for delivering a fluid, such as caustic or phosphate cleaning fluids, paints, or other fluid, to the respective bowl 26 through an intake conduit 30 connected adjacent the bottom of the respective bowl.

Withdrawal of fluid from each bowl occurs through a filter and an outlet conduit 32 for recirculation through the apparatus 28 to the intake conduit 30.

Each bowl 26 is provided with a conical bottom wall 34 and a helical track or ramp 36, as best seen in FIGS. 3–6. The track 36 is generally cantilever supported from the interior surface or wall of the bowl usually by welding and the bowl diameter, track pitch and number or turns selected for moving the articles 20 in sequence up and along the track for sequential delivery through an article outlet or escapement 38 in response to the vibration of the bowl. The escapement 38 is formed by an opening in the annular bowl wall and a generally horizontal platform portion extends through the opening and overlaps the bowl at the succeeding station for delivering the articles to the bowl 26 at the succeeding station. Thus each successive bowl, as seen in FIG. 2, is located below the level of the preceding bowl. The escapement or outlet 38 is easily arranged in a number of different angular orientations, as seen in FIG. 1, to feed the succeeding apparatus, which may therefore be positioned as convenient.

The inner or free edge 40 of each track 36 is located above the supported or outer edge or the track at the wall of the bowl and the track 36 is curved in cross-section to form a trough 42 at the juncture with the bowl wall, as best seen in FIG. 4. The trough 42 forms a guideway for advancing each of the articles in sequence along the track. The lower or first turn of the track is provided with a baffle 44 extending to the bottom wall 34. The baffle 44 overlaps the inlet from conduit 30 to prevent blockage of the inlet by the articles. The inlet is normally located below the outlet for conduit 32 which may likewise be baffle protected.

Figure 5:
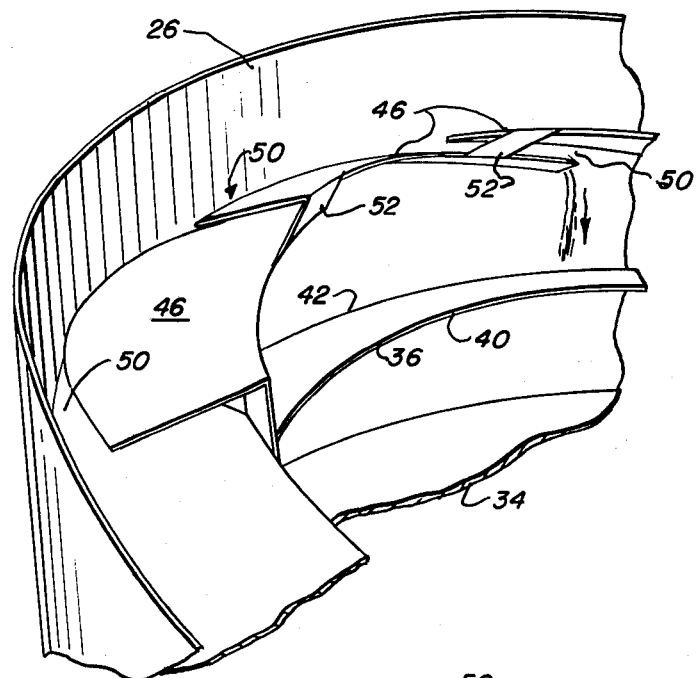
FIG. 5 is another partial isometric view of a portion of the feeder bowl and track shown in FIGS. 3 and 4 modified in accordance with the principles of the present invention.
Figure 6:
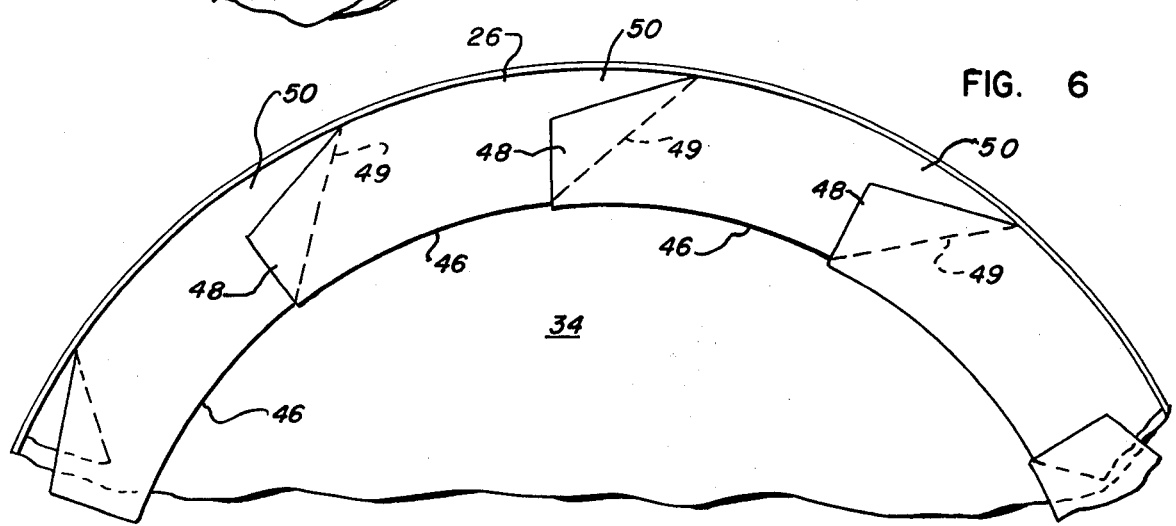
FIG. 6 is a top view illustrating the segments forming a portion of the feeder bowl track modified in accordance with the principles of the present invention.

The upper or last track turn is formed from a series of tandem or sequentially arranged upwardly inclined segments 46 with the first or lower segment overlapped by a portion of the track and the last segment generally horizontal to form the platform extending through the escapement 38 for delivering the articles to either another bowl or to the drying oven 34. The outlet or upper edge of each segment is cut away from the supporting wall of the bowl, as best seen in FIG. 6, and the upper end extends over and is spaced from the rear end portion of the succeeding segment 46, as best seen in FIGS. 3–5, to provide an overlapping portion 48 above the level of the succeeding segment. The space between the segments and bowl wall define a series of drain openings 50 for enabling fluid to escape between the segments for capture by the outlet conduit 32 since little resistance to downward flow occurs at the openings 58. The fluid may then be recirculated. A brakcet or support member 52 is formed between the free edge of each portion 48 and the segment portion just below for supporting the free end portion 48 on the succeeding segment.

As shown in FIG. 6, the ends 49 of the overlapped portions of segments 46 each define an acute angle, in the plane of the segment, with the wall of the bowl 26. This "camming angle" operates to sweep excess product away from the bottom side of the overlapping track segment if the spacing between the tracks is filled with product. In this manner, jamming of the product between the track segments is effectively prevented.

In operation of the system 10 or 10a, articles 20, such as aluminum nails, are forwarded from the hopper 22 and deposited on the conical bottom wall of the bowl 24 at station 12 where they tend to move toward the lower edge of the wall 34 and toward the track. A caustic or phosphate cleaning solution at about 170° F. is applied through inlet conduit 30 to fill the bowl to a level indicated at 54 in FIG. 3, for example. The bowl 24 is vibrated at the easily derived frequency of either a 60HZ or 120HZ rate with 120HZ providing smoother flow and the nails move up the track 36 with some fluid entrained therewith and vibrating accordingly. With the nails moving up the trough 42, a pool of liquid moves up with the nails and scrubbing action takes place between the nails and also with the track or container under the influence of the low frequency vibrations.

The solution freely drains down between the segments, as this path offers less resistance and the fluid is received either by the drain conduit 32, or deposited back in the pool at the bottom of the bowl.

The articles in the meantime sequentially exit from the bowl 26 at station 12 and drop into bowl 24 at station 14 since the platform at the outlet overlaps the succeeding bowl.

At station 14, a hot water rinse with a water temperature of substantially 170° F. is applied to the nails, which then move from station 14 and drop into the bowl 26 at either station 16 or 16a depending on the desired geometric arrangement. Stations 16 or 16a are thus arranged as desired to fit the spacial configuration of the area since the outlet 38 from each bowl can be positioned at any desired angle. This enhances the versatility of the system.

At station 16 and 16a, a clear chromate solution at a temperature of substantially 160° F. is applied to the nails to provide an aluminum chromate coat on the nails which then move to either station 18 or 18a where another hot water rinse is applied. The nails exit in sequence from the bowl 26 at the last station 18 or 18a and are deposited in the drying oven 24 or 24a, respectively, which is normally operated to deliver air heated to 350° F. at a rate of 3500 cfm. The nails are conveyed through the oven whereafter the sequentially moved nails may be counted, packaged or otherwise processed, as desired, without interrupting their flow.

In FIGS. 7–9, an embodiment of the invention is shown wherein a plurality of metal tanks 60 each have a helical track 62 connected on the outside of the tank. In this manner, tanks 60 do not serve as containers, but only as supports for the track 62.

Each of the tanks 60 is positioned within a bowl 64, which bowl 64 contains the appropriate cleaning or coating liquid. The cleaning or coating liquid may be fed to the bowl 64 via inlet 66 and may exit from the bowl via outlet 68, it being understood that the liquid may be recirculated so that the liquid flowing via outlet 68 may be reconnected to inlet 66, if desired.

Helical track 62 is shown in detail in FIG. 9. The track includes a pair of spaced, generally parallel members 66 and 68 which are fastened to the outside of tank 60 and are closed by end member 70 to form a helical fluid channel 72. Cooling or heating liquid may be fed into channel 72 in order to cool or heat the articles as they move along the track. An outside upright 74 is fastened to the radially distant end of the track 62 and, if desired, end member 70 and upright 74 may be formed of an integral metal sheet. Likewise, an upright 76 which is positioned approximately one-half the radial outward distance of the track 62 may be utilized to prevent the articles from bunching into one area of the track. Upright 76 is less in height than upright 74 and is fastened to the top surface of track 62, on which top surface the articles 20 move.

A vibration device as is well-known in the art is connected to tank 60 to provide a vibration similar to the vibration provided to tank 26. The articles may be fed into bowl 64 as indicated by the arrows in FIG. 7, and as a result of the vibration, the articles will travel upwardly along the helical track 62. At the end of the helical track 62, an escapement 78 is provided to guide the articles into the next bowl 64. In this manner, a series of bowls may be positioned adjacent to each other, at equal heights, and the articles may be fed from a first bowl where they are vibrated, cleaned or coated, and thereafter fed from the first bowl to a second bowl for subsequent operation.

Under certain circumstances it is necessary for heated articles to be cooled prior to such subsequent operation and to this end, cooling liquid may be passed through channel 72. Likewise, if it is necessary for the articles to be heated during the operation, a heating fluid may be passed through channel 72. The fluid within channel 72 will cool or heat the instrumental surface of track 62, to thereby permit a heat transfer relationship between the articles and the track during movement of the articles along the track.

It is to be understood that various modifications and substitutions may be made by those skilled in the art without departing from the novel spirit and scope of the invention.

What is claimed is:

1. Apparatus for treating a plurality of articles adapted to be moved upwardly along a track in a bowl toward an article outlet from the bowl, the improvement comprising, in combination: said track extending inwardly from the wall of said bowl, said track being helically shaped and being substantially cantilevered supported from the wall of said bowl, said helical track comprising a series of spaced apart extending in sequence toward said article outlet, with the spaced apart portions of preceding segments of said series overlapping the spaced apart portions of succeeding segments of said series and with the overlapping portions of the preceding segments being spaced from the wall of said bowl.

2. Apparatus as described in claim 1, wherein the spacing of the overlapping portions of the preceding segments from the wall form drain openings which progressively increase in size in the direction of article flow.

3. Apparatus as described in claim 1, wherein said segments are sloped downwardly toward said wall.

4. Apparatus as described in claim 1, wherein the ends of the overlapped portions of the succeeding segments define an acute angle, in the plane of the succeeding segment, with said wall.

5. Apparatus as described in claim 1, wherein the entire top surface of each of said track segments is planar.

6. Apparatus for treating a plurality of articles adapted to be moved upwardly along the track in a bowl toward an article outlet from the bowl, the improvement comprising, in combination: said track extending inwardly from the wall of said bowl, said track being helically shaped and being substantially cantilevered supported from the wall of said bowl, said helical track comprising a series of spaced apart segments extending in sequence toward said article outlet, each of said segments having a planar top surface, the spaced apart portions of preceding segments of said series overlapping the spaced apart portions of succeeding segments of said series, the overlapping portions of the preceding segments being spaced from the wall of said bowl to form drain openings which progressively increase in size in the direction of article flow, said segments being sloped downwardly toward said wall.

7. Apparatus as described in claim 6, wherein the ends of the overlapped portions of the succeeding segments define an acute angle, in the plane of the succeeding segments, with said wall.

8. Apparatus for treating a plurality of articles adapted to be moved upwardly along a track in a bowl toward an article outlet from the bowl, the improvement comprising, in combination: said track extending inwardly from the wall of said bowl, said track being helically shaped and being substantially cantilevered supported from the wall of said bowl, said helical track comprising a series of spaced apart segments extending in sequence toward said article outlet, with the spaced apart portions of preceding segments of said series overlapping the spaced apart portions of succeeding segments of said series, said track segments having a configuration in which the entire top surface of each of said track segments is planar.

9. Apparatus as described in claim 8, wherein the overlapping portions of the preceding segments are spaced from the wall of said bowl.

10. Apparatus as described in claim 9, wherein the spacing of the overlapping portions of the preceding segments from the wall form drain openings which progressively increase in size in the direction of article flow.

11. Apparatus as described in claim 10, wherein said segments are sloped downwardly toward said wall.

12. Apparatus as described in claim 8, wherein the ends of the overlapped portions of the succeeding segments define an acute angle, in the plane of the succeeding segment, with said wall.

13. Apparatus for treating a plurality of articles adapted to be moved upwardly along a track in a bowl toward an article outlet from the bowl, the improvement comprising, in combination: said bowl having a conical bottom wall on which said articles are introduced for subsequent movement toward the lower edge of the wall and toward said track, said track extending inwardly from the sidewall of said bowl, said track being helically shaped and being substantially cantilevered supported from said sidewall, said helical track comprising a series of spaced apart segments extending in sequence toward said article outlet, with the spaced apart portions of preceding segments of said series overlapping the second apart portions of succeeding segments of said series.

14. Apparatus as described in claim 13, wherein the overlapping portions of the preceding segments are spaced from the wall of said bowl.

15. Apparatus as described in claim 14, wherein the spacing of the overlapping portions of the preceding segments from the wall form drain openings which progressively increase in size in the direction of article flow.

16. Apparatus as described in claim 14, wherein said segments are sloped downwardly toward said wall.

17. Apparatus as described in claim 14, wherein the ends of the overlapped portions of the succeeding segments define an acute angle, in the plane of the succeeding segment, with said sidewall.

18. Apparatus as described in claim 14, wherein the entire top surface of each of said track segments is planar.

19. Apparatus for treating a plurality of articles adapted to be moved upwardly along a track in a bowl toward an article outlet from the bowl, the improvement comprising, in combination: said bowl having a conical bottom wall on which said articles are introduced for subsequent movement toward the lower edge of the wall and toward said track, said track extending inwardly from the sidewall of said bowl, said track being helically shaped and being substantially cantilevered supported from the wall of said bowl, said helical track comprising a series of spaced apart segments extending in sequence toward said article outlet, the ends of the overlapped portions of the succeeding segments defining an acute angle, in the plane of the succeeding segment, with said wall, the spaced apart portions of preceding segments of said series overlapping the spaced apart portions of succeeding segments of said series and with the overlapping portions of the preceding segments being spaced from the wall of said bowl, the spacing of the overlapping portions of the preceding segments from the wall forming drain openings which progressively increase in size in the direction of article flow, said segments being sloped downwardly toward said wall, and said track segments having a configuration in which the entire top surface of each of said track segments is planar.

* * * * *